United States Patent
Schultz

[11] 3,757,294
[45] Sept. 4, 1973

[54] LOW TIRE PRESSURE INDICATING AND WARNING MEANS

[76] Inventor: Howard W. Schultz, 44672 Woodrow Way, Hemet, Calif. 92343

[22] Filed: June 14, 1971

[21] Appl. No.: 152,581

[52] U.S. Cl. .............................. 340/58, 200/61.25
[51] Int. Cl. ............................................ B60c 23/02
[58] Field of Search .............................. 340/58, 60; 200/61.22, 61.25, 61.26

[56] References Cited
UNITED STATES PATENTS

| | | | |
|---|---|---|---|
| 2,063,452 | 12/1936 | McDonnell | 200/61.25 X |
| 3,162,835 | 12/1964 | Dudar | 340/58 |
| 3,537,068 | 10/1970 | Amundsen, Jr. | 340/58 |

*Primary Examiner*—Alvin H. Waring
*Attorney*—Peter H. Firsht and John H. Crowe

[57] ABSTRACT

A system for giving warning of low trailer tire pressures to a tow vehicle driver. The parts of the installed system include a bank of signal lights, button contacts attached to the outer ends of the trailer axles, leaf contacts mounted within the dust caps of the trailer wheel hubs so as to bear against the button contacts at all times, tire pressure indicators which fit onto the trailer tire valve stems and have spring-loaded plungers movable between extended and retracted positions, and cap switches which fit over the outer ends of the indicators and have fixed and resiliently movable interior contacts biased to a normally closed position. The indicators are calibrated for predetermined tire pressures which urge the plungers to extended positions in which they hold the movable contacts away from the fixed contacts in the cap switches. The system is wired in circuit with the tow vehicle battery, and the tow vehicle and trailer frames, so that a drop in pressure in any trailer tire causes retraction of the plunger in the indicator on its valve stem, closure of the cap switch on the indicator and activation of one of the signal lights. This warns the driver of the low tire pressure and signals the location of the tire in need of attention. The trailer and tow vehicle frames, with the necessary conductor bridges, serve to provide a path of current flow between the cap switches and battery.

10 Claims, 8 Drawing Figures

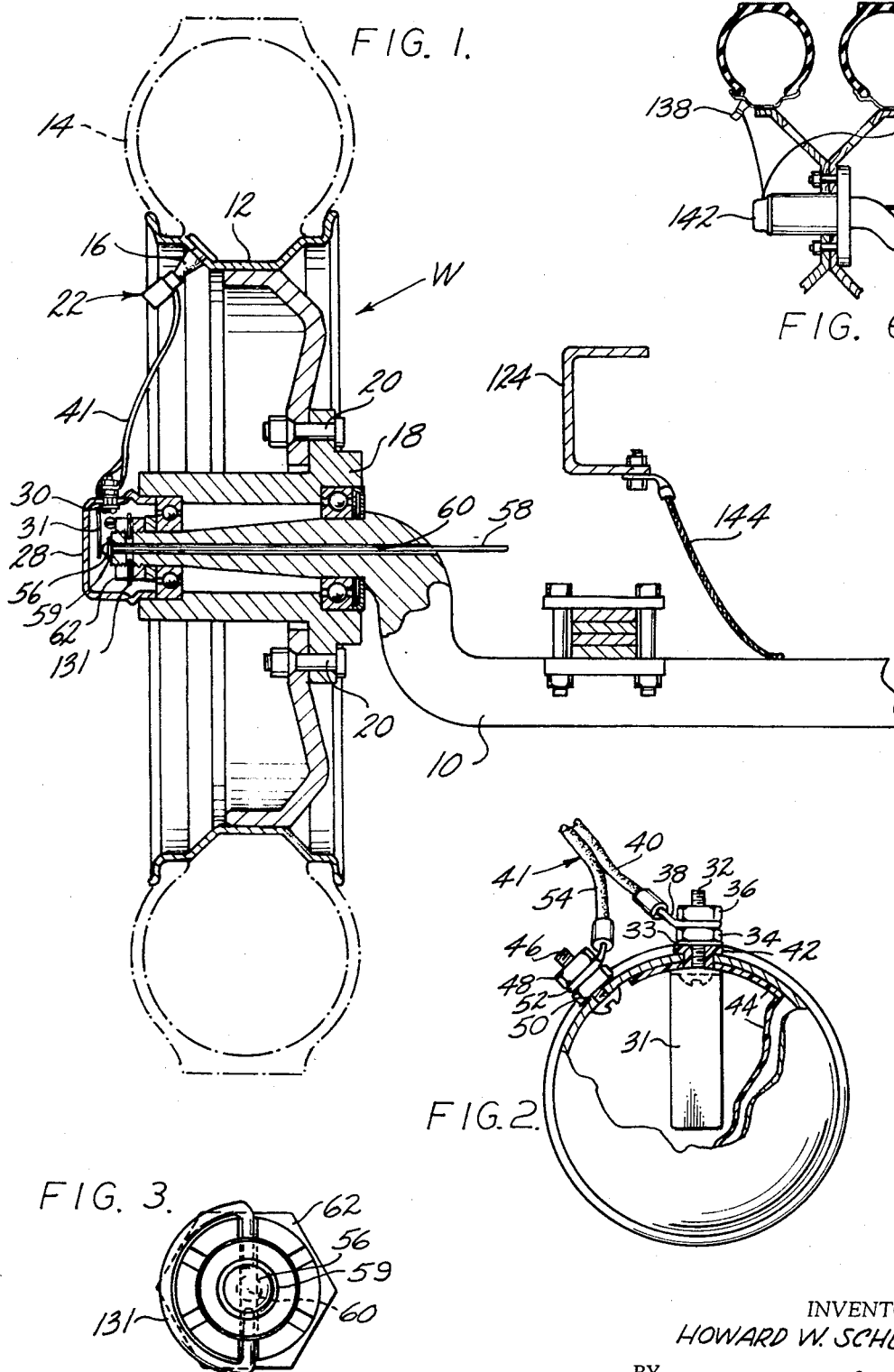

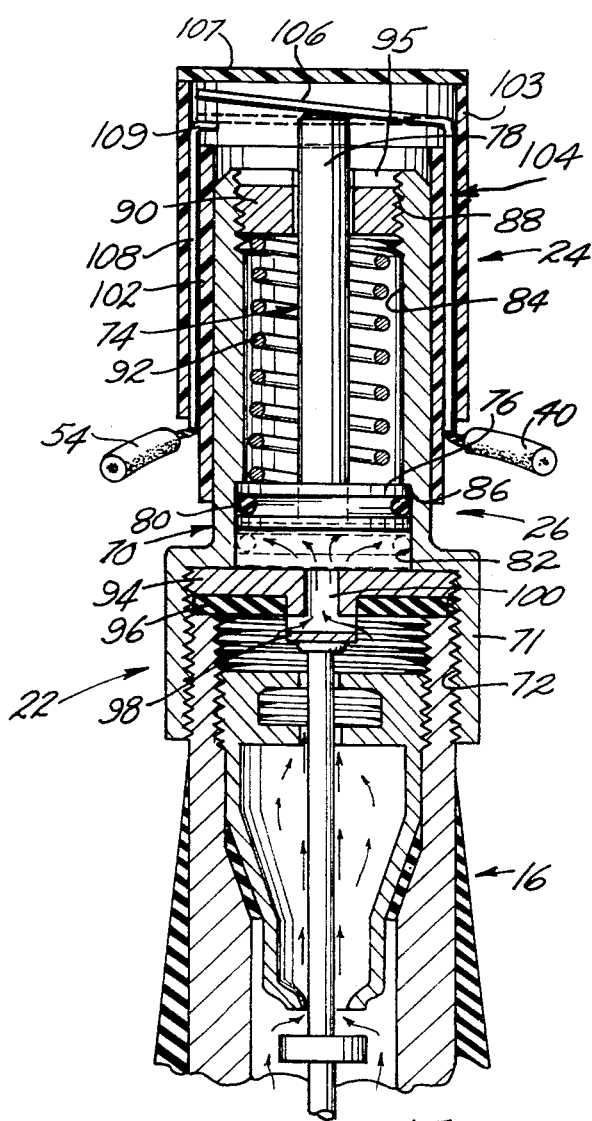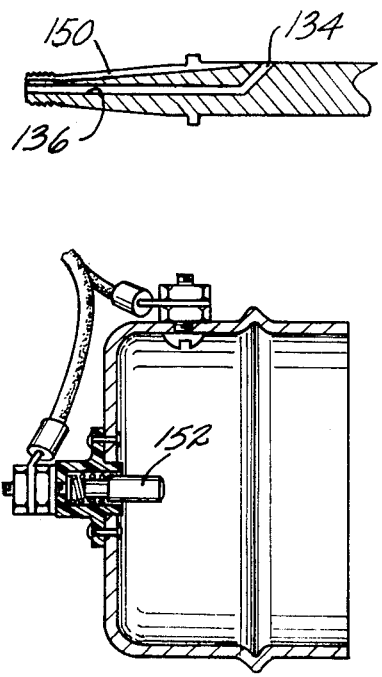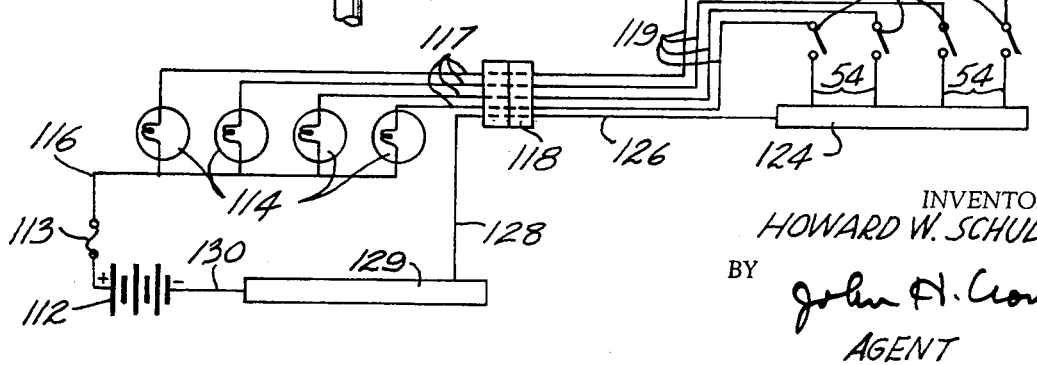

3,757,294

LOW TIRE PRESSURE INDICATING AND WARNING MEANS

BACKGROUND OF THE INVENTION

This invention relates generally to improved means for automatically detecting and giving warning of underinflation in pneumatic tires. More particularly, the invention relates to such means for monitoring the air pressure in trailer tires and signaling the driver of the tow vehicle of deflation of any of these tires below a predetermined pressure level.

There are various reasons why it is important to maintain proper air pressure in pneumatic vehicular tires. Underinflated tires, for example, wear unevenly, and at a much faster rate than do properly inflated ones. Moreover, such underinflated tires make it harder to steer and control any vehicle, either trailer or tow car. Also, underinflated tires make for increased rolling resistance, so that more power is required to move the vehicle on which they are mounted. More dangerously, underinflation results in an excessive flexing of tire sidewalls, and consequent heat generation in the tire. The generated heat can bring about breakdown of the sidewalls of the tire and lead to its complete destruction. In its most aggravated form, the excessive heat generation can even cause tires to catch on fire.

In the case of vehicles equipped with dual wheels, underinflation of one of a pair of dual wheel tires causes its companion tire to assume the load normally supported by both tires. If this continues for any length of time, irreparable damage may be done to one or both of the tires. Injury to the properly inflated tire can, for example, be brought about through the repeated bulging and transverse flexing of the underinflated tire which causes it to make rubbing contact with the facing sidewall of the adjacent, properly inflated tire. If this condition remains uncorrected, it can result in breakdown of the sidewall of the latter tire, and even cause a blowout.

It frequently happens that trailer tires, or the like, which are inflated to the proper pressure to begin with gradually lose air during use. When this occurs, the gradual reduction of tire pressure often goes undetected until the tire has been underinflated for some time. It is therefore possible for such an underinflated tire to be damaged, even to the point of destruction, before the vehicle operator becomes aware of the situation.

While various means of alerting vehicle operators to tire underinflation have been heretofore proposed, each has been characterized by shortcomings of greater or lesser degree. Some of these prior art proposals have involved the use of mechanical "feelers" to detect differences in the height of a vehicle chassis above the roadway due to tire underinflation, and to communicate a signal to the driver when lowering of the chassis reaches a predetermined, critical level. Such "feelers" are, however, vulnerable to shock damage when exposed to accidental contact with bumps or obstacles in the road, and have been found generally incapable of constant, reliable service. Furthermore, the "feelers" can give false readings through contact with such bumps, or other surface imperfections of the type found in rutted roads, muddy or sandy surfaces, and the like. Other prior art systems for giving warning of underinflated tires employ diaphragms sensitive to tire pressure which work in conjunction with switches to actuate warning devices when tire pressures drop to predetermined levels. Such systems have the disadvantage of requiring replacement of the diaphragms in the event they become ruptured, a not uncommon event. Still other low tire pressure indicating and warning systems of which I am aware have a complexity of parts, some of electronic character, which require the services of a skilled mechanic or technician for proper installation and include a number of trouble spots where malfunctioning can occur to disrupt proper functioning of the system and lead to tire difficulties of the type the system was designed to prevent. These prior art systems are made up, for the most part, of specially designed components, rather than inexpensive, off-the-shelf items, hence are too costly to appeal to many trailer owners who might otherwise wish to have them installed.

SUMMARY OF THE INVENTION

The low tire pressure indicating and warning means or system of this invention comprises a combination of simple mechanical and electrical components which can be easily installed, with a minimum of difficulty, in a suitable environment, such as on a trailer and its tow vehicle. Because of their simplified character, and ease of installation, the parts of my low tire pressure indicating and warning system do not require the services of a mechanic for such installation, but can be mounted by the trailer owner himself with little difficulty. More specifically, the functioning parts of the system include conventional wiring and fittings, and certain key elements of less conventional type, designed to cooperate as described hereinafter when installed for use in a suitable vehicular environment. While the system functions ideally on a trailer and tow vehicle, it is not limited to this particular application and can be employed on any vehicle, or train of vehicles, having pneumatic tires and at least one nonrotating axle. The system, in short, can function to give warning of underinflation in any tire on any wheel mounted on a nonrotating axle of any such vehicle or train of vehicles. The vehicle need not be a land vehicle, but can, for example, be an airplane with a conventional landing gear.

The key components of my low tire pressure indicating and warning means, in its preferred form, include a bank of annunciator elements, preferably signal lights (but sound-producing units, or the like, would serve equally well); a plurality of button contacts adapted for permanent installation on the outer ends of each trailer, or other, nonrotating axle; a plurality of resilient leaf contacts designed for mounting inside of the dust caps of the hubs of the wheels carrying the tires to be monitored in accordance with this invention so that one leaf contact bears continuously on each of the installed button contacts to permit current flow therebetween; a plurality of similarly constructed tire pressure indicators having generally cylindrical housings and spring-loaded plungers, said tire pressure indicators being threadedly engageable with the valve stems of said tires and designed so that their plungers are held in positions of extension from said housings when the tire pressures are at or above predetermined levels, and biased to positions of retraction within the housings when tire pressures fall below these levels; and a cap switch adapted to fit over the outer end of each of the tire pressure indicators, said cap switch having a fixed internal contact member and a resilient contact member biased, by virtue of its shape and resiliency, into switch-closing contact with the fixed contact member. The parts of the tire pressure indicator and cap switch are designed to cooperate, when the latter is fitted over the outer end of the indicator, in such fashion that air pressure in a properly inflated tire serves to maintain the switch in its open position by exerting force on its resilient contact member through the indicator plunger. Should the tire become underinflated, the indicator plunger is biased to its retracted position, out of contact with the resilient contact member of the cap switch, and the resilient contact member then returns to its normal position of contact with the fixed internal contact member of the switch to close the latter.

In addition to the key components mentioned above, the novel low tire pressure indicating and warning means of this invention requires, for its proper installation, wiring and fittings for tying these components together into a circuit which includes a power source for actuation of the annunciator elements to give warning of underinflation of any of the monitored tires. Where the low tire pressure indicating and warning means is installed for use on a four-wheeled trailer, and tow vehicle, for example, it will, in its preferred form, include wiring and fittings to provide a system made up of four signal lights (the annunciator elements) mounted in the tow vehicle in view of the driver; four of the aforesaid tire pressure indicators, with cap switches fitted thereon, threadedly engaged with the four valve stems of the trailer tires; four button contacts affixed to the four ends of the trailer axles; four leaf contacts mounted respectively within the four dust caps for the trailer wheel hubs so as to maintain continuous contact with the button contacts; and wiring and fittings to provide parallel current flowpaths from the tow vehicle battery through the separate signal lights to the four button contacts on the trailer axles, then through the leaf contacts to corresponding terminals of the four cap switches, then through the trailer and tow vehicle frames back to the battery.

When the trailer tires are properly inflated, the plungers in the tire pressure indicators are extended from the indicator housings and hold the resilient contact members away from the fixed contact members in the cap switches. These switches are thus in their open positions so that none of the signal lights is energized. Should the tire pressure in any of the tires fall below a predetermined level, the plunger in the pressure indicator on the valve stem of that tire moves from its extended to its retracted position, and the cap switch on the pressure indicator automatically closes. When this occurs, current can flow through the circuit controlled by the cap switch to light the signal light in that circuit and give warning to the tow vehicle driver that said tire is underinflated. It will be apparent that each of the signal lights represents a particular tire so that when it is activated the driver knows immediately which tire needs his attention. The current flows from the cap switch to the metal trailer frame through a jump wire from the switch to the dust cap on the hub of the wheel on which the tire is mounted, then through the wheel hub, wheel bearings, axle and spring to the trailer frame. To avoid difficulty in the event the spring shackles are loose, or made from nonconducting material, a pigtail bond can be connected between the trailer axle and the trailer frame.

The key components of the low tire pressure indicating and warning means of this invention are of relatively simple character and can be assembled from inexpensive, off-the-shelf items and easily installed for use on a trailer and tow vehicle, or the like. No mechanical "feeler" forms a part of the installed system, and the latter is therefore free of the above-noted disadvantages of "feeler" systems since it has no dangling parts to be damaged by bumps or obstacles in the road, nor is it dependent upon a smooth roadbed (as are conventional "feeler" systems) for accurate and trouble free operation. My novel tire pressure monitoring system has no diaphragms to rupture and cause malfunctioning and necessitate repair by a specialist. The most difficult step in the installation of the system is the provision of a suitable keyway through the wheel for a conductor serving as a flowpath for electric current passing through the button contact at the end of each of the trailer axles. Where such an axle is of the drop type, a small hole can be bored straight through each raised portion of the axle passing through a wheel hub, to an opening in the center of the corresponding end of the axle. Where the axle is straight, two holes, an axial hole and a slant hole, can be bored so as to intersect and provide a continuous conduit through which to run the wire. Another possibility is to cut a slot or groove in the wall of the axle deep enough to receive the conductor with sufficient clearance to avoid interference of the conductor with the wheel bearing races. None of these operations is particularly difficult with the proper tools, and once it is completed almost anyone can install the component parts of the system with little difficulty.

It is thus a principal object of this invention to provide low tire pressure indicating and warning means particularly suitable for use on a trailer and tow vehicle to warn the tow vehicle driver of low pressure in any of the trailer tires, and to identify the underinflated tire as soon as its pressure drops to a critical level to permit corrective action before the tire becomes damaged through use in the underinflated condition.

It is another object of the invention to provide such means capable of dependable, trouble-free operation over any roadbed, or other surface, regardless of the presence of bumps or other obstructions in the path of trailer movement.

It is still another object of the invention to provide for the creation of such means from simple, uncomplicated components, commercially available at low cost, which is installable for use with a minimum of difficulty.

Other objects, features and advantages of the invention will become apparent in the light of subsequent disclosures herein.

BRIEF DESCRIPTION OF THE DRAWINGS

FIG. 1 is a fragmentary view, mostly in section, of a trailer axle with a wheel and tire of conventional type mounted thereon and showing several key components of a preferred form of the low tire pressure indicating and warning means of this invention installed on the axle, dust cap of the wheel hub and tire valve stem, and showing, additionally, a pigtail connection between the axle and trailer frame, the tire on the wheel being shown in dashed lines.

FIG. 2 is an enlarged view of the dust cap of the FIG. 1 wheel hub, as seen from the left of its FIG. 1 position, with a portion of the dust cap wall broken away to reveal the structural details, and method of attachment, of certain electrical fittings attached to the dust cap and forming a part of the low tire pressure indicating and warning means of this invention.

FIG. 3 is an enlarged end view of the FIG. 1 axle, as seen from the left of its FIG. 1 position, showing a button contact, forming a part of my low tire pressure indicating and warning means, and showing, additionally, a C-shaped axle nut retainer in accordance with this invention fitted into the keyways for a conventional cotter pin in the axle and axle nut of the illustrated wheel assembly.

FIG. 4 is an enlarged, longitudinal view, mostly in section, of a low tire pressure indicator and cap switch assembly in accordance with this invention (shown in miniature and without internal detail in FIG. 1) positioned for use on the valve stem of the FIG. 1 tire, and showing fragmentary segments of wire conductors secured to the cap switch terminals.

FIG. 5 is a schematic circuit diagram of the low tire pressure indicating and warning means in its installed position of use on a trailer and tow vehicle.

FIG. 6 is a fragmentary view, partly in section, of dual wheels mounted on a trailer axle with certain components of the low tire pressure indicating and warning means of this invention installed thereon to illustrate the dual-wheel versatility of the invention.

FIG. 7 is a fragmentary view, in longitudinal section, of a straight trailer axle bored to receive a conductor running to a button contact, not shown, on the end of the axle, and showing, in dashed lines, a groove along the top of the outer portion of the axle as an alternative key- or guideway (through the wheel hub) for such a conductor.

FIG. 8 is a view, mostly in section, of a wheel hub dust cap having electrical fittings of different character than those shown on the FIG. 2 dust cap, suitable for use where free space within the installed dust cap is limited.

DESCRIPTION OF THE PREFERRED EMBODIMENTS

Considering now the drawings in greater detail, with emphasis first on FIG. 1, there is shown at W a trailer wheel of conventional type, mounted on a nonrotating axle 10. Wheel W has a rim 12 on which mounted a tire 14 (shown in dashed lines). The wheel rim has a valve stem 16 secured in an appropriate opening therethrough. The wheel is tightly secured to a hub 18 by nut and bolt fastening means 20. All parts of the wheel, hub and axle so far described are conventional.

Affixed to wheel W are certain key components of the low tire pressure indicating and warning means of this invention, including a tire pressure indicator and switch assembly 22, and certain electrical fixtures attached to axle 10 and to a dust cap 28 fitted, in the usual fashion, to the outer end of wheel hub 18. Focusing first on axle 10, which is of the drop type, it will be noted that the raised end of the axle, passing through hub 18, has a longitudinal bore 60 running axially therethrough to termination at the flat outer end of the axle. Passing through this bore is an insulated wire 58. The outer end of the wire, its left end as seen in FIG. 1, passes through a washer 59, made of an insulating material such as a reinforced phenolic resin, and is soldered to a metal button contact 56, with a flat underside, positioned concentrically on the end of the axle as shown. Wire 58 extends from button contact 56 to a disconnect plug 118 (see FIG. 5) between the trailer and its tow vehicle. The disconnect plug is a commercially available item, not necessary to illustrate or describe in detail here, and its role in the low tire pressure indicating and warning means of this invention is not critical, as will be seen.

Button contact 56 is made of a hard, tough electrically conductive material, such as, for example, stainless steel, and it has a smooth rounded outer surface to permit good contact at all times between it and a resilient contact member 30, soon to be described. The button contact, and insulating washer 59, are fastened together, and the washer firmly secured to the outer end of axle 10, by means of a suitable adhesive, such as, for example, a commercially available epoxy or phenolic adhesive. Resilient contact member 30 is formed from a strip of thin sheet metal of electrically conductive character. The strip is bent sharply so that there is a relatively short segment and a slightly bowed longer segment either side of the bend. The longer segment is shown at 31 in FIGS. 1 and 2, and is referred to hereinafter, for obvious reasons, as leaf contact 31. Its slightly bowed character gives leaf contact 31 an inherent bias toward button contact 56 when installed for use as described below.

The resilient contact member 30 is tightly secured to the inside wall of dust cap 28, by means of a machine screw 32 and a fastening nut 34, so that its leaf segment (leaf contact 31) extends diametrically across the space within the dust cap outboard of button contact 56 and, by virtue of its position and bowed shape, bears resiliently against the button contact at all times. This is true even when wheel W is rotating, and contact member 30 is turning with dust cap 28, although button contact 56 remains stationary relative to the dust cap.

The reason for the smooth, rounded character of the outer surface of the button contact, as should now be apparent, is to allow relative movement between the button contact and leaf contact 31 with minimal frictional resistance, and resultant wear on these parts. To further minimize this wear, contact member 30 is preferably made of a tough, durable metal or alloy of properly conductive character, such as, for example, stainless steel. A less wear resistant metal or alloy such as, for example, brass, can be employed in lieu of stainless steel if desired, but it will not give satisfactory service for as long a period of time as the stainless steel.

Contact member 30 is installed on dust cap 28 with protective insulation between it and the dust cap wall. Screw 32, as FIG. 2 best shows, passes through an appropriate opening in the wall of the dust cap and is prevented from coming into contact with the wall by the presence of a rubber ring 42 around the shank of the screw. Rubber ring 42 has a reduced segment sized to fit tightly into the wall opening and a radially enlarged segment which serves as a seat for an insulating washer 31 against which the nut 32 can be drawn tightly without coming into contact with the dust cap wall. Additionally, a thin layer 44 of rubber insulating material, such as rubber adhesive tape, is laminated to the inner wall of the dust cap to provide a nonconductive barrier between the wall and the short segment of contact member 30 through which screw 32 passes to anchor that member to the dust cap. For added protection, the layer of insulating material is extended to cover that portion of the inner surface of the enclosed end of the dust cap to the left of leaf contact 31, as seen in FIG.

1. FIG. 2 best illustrates this area of dust cap wall coverage by the insulating material. The area of coverage could, if desired, be reduced, since it is only necessary that enough insulation be present to prevent shorting between contact member 30 and the dust cap. A suitable insulating material other than rubber tape, such as, for example, a layer of phenolic resin, could be substituted for the tape, within the scope of my invention.

While resilient contact member 30 is anchored firmly enough to dust cap 28 by machine screw 32 and nut 34 when the nut is drawn tightly against insulating washer 31, all of these parts are preferably bonded together to prevent loosening of the contact member when nut 34 is loosened. One way of accomplishing this is to solder the head of screw 32 to the contact member and cement the short segment of the latter (which is sandwiched between the layer of insulating material 44 and the wall of the dust cap) in position by means of a suitable phenolic or epoxy resin.

A second nut 36, similar to nut 34, is employed in conjunction with the latter to clamp the eyelet 38 of a wire lead 40 in conductive position relative to leaf contact 31, as best illustrated in FIG. 2. Wire lead 40 is one of a pair of conductors forming an electric cord 41, which serves a purpose hereinafter denoted. The other one of the pair of conductors is shown at 54. As FIG. 2 best illustrates, conductor 54 is connected to dust cap 28 by means of a machine screw 46 and a pair of nuts 48 and 50. The dust cap wall is provided with a hole for screw 46, and conductor 54 has a terminal eyelet 52, to permit this connection.

Electric cord 41 runs from grease cap 28 and the screw 32 terminal for leaf contact 31 to the tire pressure indicator and switch assembly 22. This assembly consists of a tire pressure indicator 26 and a cap switch 24 (see FIG. 4) designed to fit together tightly enough to prevent their separation in normal use, yet not so tightly as to prevent them from being easily unsnapped for inspection, repair, etc. The tire pressure indicator 26 is threadedly engaged with tire valve stem 16, and designed to indicate, by the position (extended or retracted) of the shank of a plunger 74 forming a part thereof, whether the air pressure in the tire is above or below a predetermined level. FIG. 4 shows the internal details of indicator 26.

Tire pressure indicator 26 has a generally cylindrical housing 70 with a reduced portion and an enlarged end 71 hollowed and tapped, as shown at 72, to provide a threaded socket for engagement with a tire valve stem. The reduced portion of housing 70 is hollowed to receive the plunger 74, which comprises a piston head 76 and a coaxial shank 78 running outwardly, toward the upper end of the housing (as seen in FIG. 4), therefrom. The hollow interior of this portion of the housing has an enlarged lower segment 82, adapted to receive the piston head of plunger 74 in slideable relationship, and a reduced upper segment 84, separated by an annular shoulder 86 which serves as a stop for the piston head to prevent its movement therebeyond under the influence of pneumatic tire pressure when air from the tire is admitted to enlarged segment 82 of the hollow interior of the reduced portion of housing 70 in a manner shortly to be described. Piston head 76 has a sealing O-ring 80 seated in a groove around its wall to prevent leakage of the tire air beyond the piston head in housing 70.

Shank 78 of plunger 74 extends outwardly to a point just slightly beyond the outer end of indicator 26, when piston head 76 is in its innermost (retracted) position within the housing, as illustrated in dashed lines in FIG. 4. The outer portion of the cylindrical wall defining reduced segment 84 of the plunger hollow within indicator housing 70 is threaded, as shown at 88, to receive an axially adjustable stop screw 90 having a concentric opening sized to permit free axial movement of the plunger shank 78 between its extremes of position within the housing. Disposed, under compression, between stop screw 90 and the upper face of piston head 76 of plunger 74 (as seen in FIG. 4) is a spiral biasing spring 92 adapted to hold plunger 74 in the retracted position within housing 70 illustrated in dashed lines in FIG. 4. A generally flat screw 94 is threadedly positioned in the bottom of the threaded socket in enlarged end 71 of indicator housing 70, to serve as a lower stop for the piston head of plunger 74. Stop screw 94 has a boss 98 for depressing the valve core plunger of a tire valve stem and thereby admitting compressed air from the tire to the interior of tire pressure indicator 26. As will appear, the compressed air exerts pressure on the bottom of the piston head, in opposition to the biasing pressure of spring 92 on the top of said piston head.

There is a flat, centrally apertured seal 96 of a resilient rubber or plastic material bonded to the annular lower face of stop screw 94 around boss 98. Any suitable means can be employed for bonding this seal to screw 94. For example, a resin adhesive selected from the many well-known phenolic, epoxy, and the like, adhesives commercially available under various trade names can be utilized for the purpose. Seal 96 can, if desired, be threaded around its outer periphery for greater ease of installation of stop screw 94 in the threaded tire valve stem socket of indicator 26.

As will be apparent from the foregoing, piston head 76 of plunger 74 is held in its retracted position within housing 70 by biasing spring 92 when there is no compressed air from a tire acting against the force of the spring. The axially adjustable stop screw 90 is slotted on its exposed face, as shown in dashed lines at 95, to permit turning of the screw into and out of the threaded upper portion of reduced segment 84 of the hollow within the reduced portion of housing 70, for adjustment of the biasing force of spring 92 on piston head 76 and calibration of the indicator for use at different tire pressure levels. In one position of the stop screw, the spring force might, for example, be adequate to hold plunger 74 in its retracted position within indicator housing 70 at all tire pressures below 70 psi, in a second position at all pressures below 50 psi, etc. Thus, indicator 26 is adjustable for use on pneumatic tires over a range of tire pressures, rather than being limited to use at one particular pressure. Moreover, a spring of greater or lesser force than spring 92 could be substituted therefor to permit use of the indicator over a different range of tire pressures.

It will now be apparent that installation of indicator 26 on a tire valve stem forces the tire valve open and permits air to escape from the tire and exert pressure on the lower face of the piston head of plunger 74. So long as the air pressure in the tire is above a predetermined level, for which the indicator is calibrated, it pushes plunger 74 against biasing spring 92 so that a part of its shank 78 extends axially outwardly from the upper end of indicator 26, as illustrated in solid lines in FIG. 4. Should the tire pressure within the tire drop, through slow leakage or for some other reason, below this predetermined level, the biasing spring 92 pushes plunger 74 back to its retracted position within housing 70, and the outer end of the plunger shank 78 no longer extends out of the indicator.

Tire valve stem 16 is of conventional type, with conventional valve core components. These components are shown generally in FIG. 4, and the manner in which the boss 98 of stop screw 94 depresses the valve core plunger and permits air from the tire to exert pressure on piston head 76 of the indicator plunger is readily apparent from this illustration. Stop screw 94 and boss 98 have cooperating passageways 100 to allow air to pass from the valve stem into the piston head hollow 82 in the indicator housing. Directional arrows show the flowpath of the air from the tire through the valve core and into passageways 100, and from there into hollow 82.

Cap switch 24 is of generally cylindrical construction, and, as previously indicated, sized to fit snugly over the outer end of indicator 26. This switch is formed from a pair of partially telescoped segments of tubing; a flat, disc-shaped closure 107; and a pair of electrical contact strips 104 and 108. The switch is assembled with the inner tubular segment, shown at 102, fitted into the other tubular segment, shown at 103, and the two electrical contact strips sandwiched therebetween on diametrically opposite sides of the composite structure. The electrical contact strips are formed from an electrically conductive material, such as brass or copper, and the tubular segments are fabricated from a nonconductive phenolic, or equivalent plastic, material. These segments are of approximately the same length, but arranged in axially offset relationship so that the top of the outer (as seen in FIG. 4) is higher than that of the inner and the bottom of the inner segment extends below the bottom of the outer one. The tubular segments are bonded firmly together with a suitable cementitious material, such as a phenolic or epoxy adhesive. Disc-shaped closure 107 is preferably made from a nonconductive material similar to that from which tubular segments 102 and 103 are formed, and is fastened around its periphery to the top rim of the former (outer) segment by phenolic adhesive, or other suitable, means.

The bottoms of the electrical contact strips 104 and 108 are positioned below the bottom rim of the outer tubular segment 103, and the previously mentioned conductor wires 40 and 54 are connected thereto, as by soldering or other suitable means, for a purpose hereinafter revealed. The contact strips extend upwardly beyond the top of the inner tubular segment 102, as seen in FIG. 4, and are then bent sharply so as to extend toward each other. The inturned strip segment resulting from the bend in contact strip 104 is shown at 106, and extends almost all the way across the hollow interior of the cap switch. The corresponding segment of contact strip 108 is shown at 109, and extends only for a short distance into the hollow interior of the cap switch. Strip segments 106 and 109 are arranged so that the outer tip of the former bears on the flat top surface of the latter in its normal position of rest, as indicated in dashed lines in FIG. 4. Additionally, the bend in contact strip 104 is sharp enough to bias segment 106 of that strip into contact with segment 109 of contact strip 108, and thereby maintain cap switch 24 in a normally closed position. The junctions of conductor wires 40 and 54, and the lower ends of contact strips 104 and 108, are preferably insulated by a protective covering of phenolic or other suitable, insulating material.

Movement of plunger 74 to its outer (extended) position, under the influence of pneumatic tire pressure, brings its shank 78 into contact with segment 106 of contact strip 104, and causes tilting of that segment (which is resilient enough to yield to such tilting) until its outer end breaks contact with inturned segment 109 of contact member 108. This action of the plunger causes the cap switch to remain open so long as the tire pressure stays above the predetermined level for which tire pressure indicator 26 was calibrated. If the tire pressure drops below this level, plunger 74 is forced inwardly within housing 70, by biasing spring 92, until it no longer holds segment 106 of contact strip 104 away from segment 109 of contact strip 108, and the switch automatically closes. As previously explained, conductor wires 40 and 54 join the terminals of the two cap switch contact strips with leaf contact 31 in dust cap 28 of wheel hub 18 and the metal wall of the dust cap itself, respectively.

The manner in which the low tire pressure indicating and warning system of this invention functions can be understood by reference to FIG. 5, which shows schematically the circuit diagram of such a system installed on a four-wheel trailer hitched to a tow vehicle. In the FIG. 5 circuit, one terminal each of a bank 114 of four signal lights is connected, through a fuse 113, to the tow vehicle battery, shown at 112, by means of wiring 116. Additional wiring 117 connects each of the other of the signal light terminals to a disconnect plug 118 installed between the tow vehicle and trailer. Still more wiring 119 serves to extend the light circuits from the disconnect plug to one set of terminals on four cap switches 24 installed on the four trailer tires. The term "wiring," as here used (wiring 119), includes wire leads from the disconnect plug 118 to button contacts at the outer ends of each of the trailer axles, leaf contacts in the trailer wheel hub dust caps and conductors between the leaf contacts and corresponding terminals of the cap switches 24.

Referring again to FIG. 5, it will be noted that the opposite terminals of the cap switches 24 are grounded to the trailer frame (shown schematically at 124) by means of four conductors 54, this being accomplished, as previously explained (by reference to conductor 54 in FIGS. 2 and 4), by fastening the conductors to the dust caps of the hubs of the trailer wheels. The current flow passes through each metal dust cap to the trailer frame in the previously indicated manner (through the wheel bearings, axles, etc.), from whence it is picked up by a jump wire 126 between the trailer frame and disconnect plug 118. From the disconnect plug, another jump wire 128 permits the current to flow from the disconnect plug to the tow vehicle frame 129, and still another wire 130 conducts this current back to the tow vehicle battery 112.

As will be clear from FIG. 5, the four light units of signal light bank 114 are in parallel circuit, and each is in series with one of the four cap switches 24. Thus, each light is controlled by a separate one of the switches, so that low pressure in the tire on which this switch is installed causes the light to go on and signal the driver of low pressure in that particular tire. The driver is thus given notice not only of the existence of a low pressure tire, but of the location of the tire as well. He can then go directly to the low pressure tire to take fast and effective remedial action when necessary.

In the particular hub circuit illustrated in FIG. 1, the elevated end portion of trailer axle 10 has, as previously noted, an axial bore hole for conductor wire 58 leading from trailer disconnect plug 118 (not shown in FIG. 1) to a button contact 56 on the outer end of the axle. Because of the presence of this wire, the axle nut, shown at 62, cannot be secured by means of a conventional cotter pin, and a C-shaped retainer clip, with aligned, inturned ends, is employed in its place. This retainer clip is shown at 131 (see, in particular, FIG. 3), and is made of a tough resilient steel, or similarly suitable metal. It is installed in position with its inturned ends inserted, from opposite directions, into the cotter pin bore hole in the axle.

FIG. 1 shows, to the right of wheel W, a pigtail bond 144 between the trailer axle 10 and the trailer frame, the latter being shown in fragmentary cross section at 124. The purpose of this bond is to assure current flow between the trailer axle and trailer frame in the event the spring shackles are loose or made from a nonconductive material.

FIG. 6 illustrates the manner in which the tire pressure indicator and cap switch assembly of my invention can be mounted on dual wheels to give warning of low pressure in either of the two dual wheel tires. Each of the two tire valve stems on the wheels has a tire pressure indicator and cap switch assembly identical to tire pressure indicator and cap switch assembly 22 threadedly engaged therewith, these assemblies being shown at 138 and 140, respectively. Conductor wires run from the cap switch on each of these tire pressure indicator and cap switch assemblies to the common wheel hub dust cap for the dual wheels, and are connected to the dust cap (shown at 142) and a resilient contact member mounted therein similarly to the way conductor wires 40 and 54 are connected to wheel hub dust cap 28 and resilient contact member 30, respectively, of the FIG. 1 assembly. It will thus be apparent that low pressure in either tire will cause the cap switch mounted on its valve stem to close, and light one of the signal lights in the tow vehicle. While the same light signals low tire pressure in either of the dual wheel tires, it is a simple matter for the tow vehicle driver, knowing which pair of wheels is involved, to determine the low pressure tire. If necessary, the driver can unscrew the tire pressure indicator and switch assembly from one, or both, of the tire valve stems to determine which of the low tire pressure indicators has a retracted plunger, which is, of course, an indication of low tire pressure.

FIG. 7 shows a fragmentary portion of a straight axle with alternative guideways for running a conductor wire through a wheel hub to a button contact on the end of the axle. The first of these guideways comprises meeting bore holes, one axial and the other slanted, as shown at 136 and 134, respectively. The second guideway is merely a groove or slot 150 in the top of the axle, shown in dashed lines, to receive the wire. To confine the wire in the groove, it can be cemented in place with a suitable phenolic, or other, resin. The wire can be bent sharply at the outer end of the axle for connection with a button contact positioned similarly on the axle to the way button contact 56 is positioned on axle 10. The wire groove need not be very deep, one thirty-second inch being sufficient where the conductor is a flat piece of wire. The wheel bearings can be pressed onto the axle, over the groove, to function in normal fashion.

In the event there is insufficient space within a wheel hub dust cap for receiving a resilient contact member such as contact member 30, alternative contact means can be mounted on the outside of the dust cap. Such alternative means could, for example, comprise a carbon brush or aluminum electrode, in which case the dust cap could be easily modified to provide access for the electrode to a cooperating button contact on the involved wheel axle. The electrode would preferably be equipped with biasing means to assure continuous pressing contact between it and the button contact. FIG. 8 shows a hookup of this type, with an adaptor carrying a spring-loaded electrode 152 for use in lieu of the resilient contact member 30 of FIG. 1.

While the novel low tire pressure indicating and warning means of this invention has been herein described and illustrated in what are considered to be preferred embodiments, it will be understood by those skilled in the art that various departures may be made therefrom within the scope of the invention. Certain of these departures have already been mentioned, and others will occur to those skilled in the art in the light of present teachings. As an example of the latter, the trailer frame ground wire from the tire pressure indicator and cap switch assembly 22 could be run to the trailer wheel, rather than to the wheel hub dust cap. It is more practical to run this wire to the dust cap, however, because it is then possible to do diagnosis and repair work on the fittings at either end of conductor cord 41 by merely pulling the dust cap or cap switch, as the case may be, loose until the diagnosis or repair work has been completed.

Many noncritical refinements of my illustrated low tire pressure indicating and warning system will suggest themselves to those skilled in the art. For example, an internal O-ring could be provided for the cap switch to act as a water seal and prevent moisture damage to the switch contacts. Also, a suitable switch could be put in the hot line from the battery, if desired, or the circuit could be hooked up to the ignition switch in the tow vehicle. Such a switch in the system would provide a means of inactivating the latter when no one is in the tow vehicle, to thereby prevent burning of the signal lights for long periods of time when no one is around. Even if such burning were to take place, however, the danger of battery rundown would be virtually nonexistent, since very low amperage lamps (½-amp lamps, for example), drawing very little current, will suffice for the signal light purposes of my invention.

In summary, the scope of the present invention extends to all of its variant forms encompassed by the language of the following claims.

I claim:

1. Low tire pressure indicating and warning means, comprising:
   at least one annunciator unit capable of giving a warning signal when energized by an electric current;
   at least one electrical contact point designed for insulated attachment to one end of a nonrotating vehicle axle fitted with a wheel on which is mounted a pneumatic tire;
   resilient pickup contact means designed for attachment to the dust cap of the hub of said wheel so as to rotate with the wheel while maintaining electrical contact with said electrical contact point attached to said axle;

at least one tire pressure indicating means adapted for threaded engagement with the valve stem of said tire and having a housing, a piston head plunger with an integral shaft and biasing means for said plunger; and at least one switch having a hollow casing adapted to fit snugly onto said low tire pressure indicating means;

the housing for said low tire pressure indicating means being hollowed to receive said piston head plunger and permit movement of the latter between a retracted position, in which it is disposed substantially entirely within said housing, and an extending position, in which a portion of its shaft extends out of said housing, and said biasing means being resiliently adaptable to hold said plunger in said retracted position at all counterpressures on its piston head below a predetermined level;

said low tire pressure indicating means being adapted, when in threaded engagement with said valve stem, to depress the tire valve plunger and thereby permit pressurized air from said tire to act in opposition to said biasing means on said piston head plunger, whereby the air pressure urges the piston head plunger away from said retracted position toward said extending position when said pressure exceeds said predetermined level, but the biasing means urges the piston head plunger back to said retracted position if the air pressure falls below said predetermined level;

the manner in which the casing of said switch fits onto said low tire pressure indicating means being such that its hollow interior receives the shaft of said piston head plunger when it extends from said housing in its extending position;

said switch having a pair of built-in electrical contact members, a first one of which has a terminal end of fixed position within said casing to form a first electrical contact and the second of which has an elongate segment resiliently movable about a bend spaced from said first electrical contact within said casing, said resilient elongate segment being self-biased into bearing contact, at its outer end, with said first electrical contact;

said switch being designed to cooperate, in use, with said low tire pressure indicating means in such fashion that outward extension of the shaft of the piston head plunger of the latter, under the influence of tire air pressure, brings said shaft into switch-opening contact with the resiliently movable elongate segment of the second electrical contact member, and movement of the piston head plunger to its retracted position within said housing, as a result of a drop in tire air pressure below said predetermined level, carries the plunger shaft out of contact with said elongate segment so that the latter biases itself into bearing contact with said first electrical contact to effect automatic closure of the switch; and the above-claimed components cooperating with one another to provide said low tire pressure indicating and warning means for at least one tire on a vehicle when installed in combination with a source of electric energy and electrical conductor means in a vehicular environment comprising said vehicle, and said electrical conductor means is adapted to connect said components in circuit and permit the flow of electric current from the source of electric energy through said annunciator unit to said electrical contact point on the end of a nonrotating axle on said vehicle, then through said resilient pickup contact means attached to the dust cap on the wheel hub of said vehicle to one of said electrical contacts of said switch, then through the other electrical contact of said switch, when the switch is closed, to the metal frame of the vehicle and from this frame back to said source of electric energy;

whereby the circuit remains open so long as the air pressure in said tire is above said predetermined level to urge the piston head plunger of said low tire pressure indicating means into switch-opening contact with the resiliently movable segment of said second electrical contact in said switch, but closes when said air pressure drops below said predetermined level so that current flows through the circuit to actuate said annunciator unit to actuate it and give warning of the air pressure drop within the tire.

2. Low tire pressure indicating and warning means in accordance with claim 1 in which the hollow casing of said at least one switch is of cylindrical shape and enclosed at one end so as to afford weather and dust protection for said built-in electrical contact members and said dust cap is of an electrically conductive material, and which has an electrical conductor connecting said other electrical contact of said switch to said dust cap, whereby the flow of electric current from the switch to the metal frame of said vehicle proceeds from the dust cap through the hub of said wheel, then through the wheel bearings, axle and vehicle springs to said frame.

3. Low tire pressure indicating and warning means in accordance with claim 2 adapted to provide warning of tire pressure below said predetermined level in any tire on any nonrotating axle on said vehicle; said annunciator means is a bank of signal lights, each light being connected in circuit with the appropriate electrical fittings on a separate wheel and the valve stem of the tire on that wheel so that it can give warning of low pressure in that tire; and said bank of signal lights is positioned where it can be readily seen by the driver in charge of said vehicle; whereby the driver can tell by a warning signal from any given signal light which vehicle axle, and which end of said axle, has a low pressure tire.

4. Low tire pressure indicating and warning means in accordance with claim 1 in which said resilient pickup contact is formed from a strip of thin, springy metal; and the pickup contact has a base segment by means of which it is securable to the side wall of said dust cap, in the space within the dust cap, and a leaf segment separated from the base segment by a sharp bend, said leaf segment being sized and shaped to extend into said space and bear resiliently against said electrical contact point attached to said axle, when said base segment is secured in proper position to said side wall of said dust cap.

5. Low tire pressure indicating and warning means in accordance with claim 1 in which said electrical contact members of said switch are formed of thin strips of suitably conductive metal, mounted in parallel and diametrically opposite relationship within the switch; said elongate segment of the second contact member is designed to extend substantially across the interior space within said hollow casing; and said first electrical contact is positioned to receive the outer end of said elongate segment in bearing contact, to close said switch, when the latter is disposed in its normal position within said casing.

6. Low tire pressure indicating and warning means in accordance with claim 2 adaptable for use on vehicles with dual wheels in which each of the tire valve stems on each pair of dual wheels is fitted with the tire pressure indicating means and switch components of said low tire pressure indicating and warning means, and the switch on each wheel has an electrical conductor joining one of its electrical contacts with a dust cap common to said pair of dual wheels, whereby a pressure drop below said predetermined level in the tire on either of the wheels causes actuation of said annunciator unit.

7. Low tire pressure indicating and warning means in accordance with claim 3 in which said vehicle is a trailer and said driver is the driver of a tow vehicle for said trailer;
   said source of electric energy is the tow vehicle battery; and
   including a disconnect plug;
   whereby said signal lights can be installed in said tow vehicle and connected respectively in circuit with the electrical contact points on the ends of each nonrotating axle on said trailer through said disconnect plug.

8. Low tire pressure indicating and warning means in accordance with claim 7 in which said disconnect plug has terminals for connecting wire leads from the frames of the tow vehicle and trailer to assure good electrical contact therebetween.

9. Low tire pressure indicating and warning means in accordance with claim 7 in which said electrical conductor means includes a bridging wire for connecting each nonrotating axle on said trailer with said trailer frame to assure unhindered current flow between said switch and said trailer frame when the switch is closed.

10. In combination, vehicle means having at least one nonrotating axle and adapted to roll on wheels with pneumatic tires, and low tire pressure indicating and warning means comprising:
   at least one annunciator unit capable of giving a warning signal when energized by an electric current;
   at least one electrical contact point designed for insulated attachment to one end of a nonrotating vehicle axle fitted with a wheel on which is mounted a pneumatic tire;
   resilient pickup contact means designed for attachment to the dust cap of the hub of said wheel so as to rotate with the wheel while maintaining electrical contact with said electrical contact point attached to said axle;
   at least one tire pressure indicating means adapted for threaded engagement with the valve stem of said tire and having a housing, a piston head plunger with an integral shaft and biasing means for said plunger; and
   at least one switch having a hollow casing adapted to fit snugly onto said low tire pressure indicating means;
   the housing for said low tire pressure indicating means being hollowed to receive said piston head plunger and permit movement of the latter between a retracted position, in which it is disposed substantially entirely within said housing, and an extending position, in which a portion of its shaft extends out of said housing, and said biasing means being resiliently adaptable to hold said plunger in said retracted position at all counterpressures on its piston head below a predetermined level;
   said low tire pressure indicating means being adapted, when in threaded engagement with said valve stem, to depress the tire valve plunger and thereby permit pressurized air from said tire to act in opposition to said biasing means on said piston head plunger, whereby the air pressure urges the piston head plunger away from said retracted position toward said extending position when said pressure exceeds said predetermined level, but the biasing means urges the piston head plunger back to said retracted position if the air pressure falls below said predetermined level;
   the manner in which the casing of said switch fits onto said low tire pressure indicating means being such that its hollow interior receives the shaft of said piston head plunger when it extends from said housing in its extending position;
   said switch having a pair of built-in electrical contact members, a first one of which has a terminal end of fixed position within said casing to form a first electrical contact and the second of which has an elongate segment resiliently movable about a bend spaced from said first electrical contact within said casing, said resilient elongate segment being self-biased into bearing contact, at its outer end, with said first electrical contact;
   said switch being designed to cooperate, in use, with said low tire pressure indicating means in such fashion that outward extension of the shaft of the piston head plunger of the latter, under the influence of tire air pressure, brings said shaft into switch-opening contact with the resiliently movable elongate element of the second electrical contact member, and movement of the piston head plunger to its retracted position within said housing, as a result of a drop in tire air pressure below said predetermined level, carries the plunger shaft out of contact with said elongate segment so that the latter biases itself into bearing contact with said first electrical contact to effect automatic closure of the switch; and
   the above-claimed components of said low tire pressure indicating and warning means cooperating with one another to provide said low tire pressure indicating and warning means for at least one tire on said vehicle means when installed in combination with a source of electric energy and electrical conductor means in a vehicular environment comprising said vehicle means, and said electrical conductor means is adapted to connect said components in circuit and permit the flow of electric current from the source of electric energy through said annunciator unit to said electrical contact point on the end of a nonrotating axle on said vehicle, then through said resilient pickup contact means attached to the dust cap on the wheel hub of said vehicle to one of said electrical contacts of said switch, then through the other electrical contact of said switch, when the switch is closed, to the metal frame of the vehicle means and from this frame back to said source of electric energy;

whereby the circuit remains open so long as the air pressure in said tire is above said predetermined level to urge the piston head plunger of said low tire pressure indicating means into switch-opening contact with the resiliently movable segment of said second electrical contact in said switch, but closes when said air pressure drops below said predetermined level so that current flows through the circuit to actuate said annunciator unit to actuate it and give warning of the air pressure drop within the tire.

* * * * *

UNITED STATES PATENT AND TRADEMARK OFFICE
CERTIFICATE OF CORRECTION

PATENT NO. : 3,757,294
DATED : September 4, 1973
INVENTOR(S) : Howard W. Schultz It is certified that error appears in the above-identified patent and that said Letters Patent are hereby corrected as shown below:

Column 5, line 30, cancel ", in dashed lines,". Column 11, lines 59 and 60, cancel ", shown in dashed lines,".

Signed and Sealed this

Fourth Day of November 1980

[SEAL]

Attest:

SIDNEY A. DIAMOND

Attesting Officer

Commissioner of Patents and Trademarks